April 17, 1951 A. C. TRODEN ET AL 2,549,266
CAMP TRAILER STRUCTURE
Filed Nov. 18, 1946 4 Sheets-Sheet 3

INVENTORS
AUGUSTUS C. TRODEN
BY NELSON HALL
ATTORNEYS

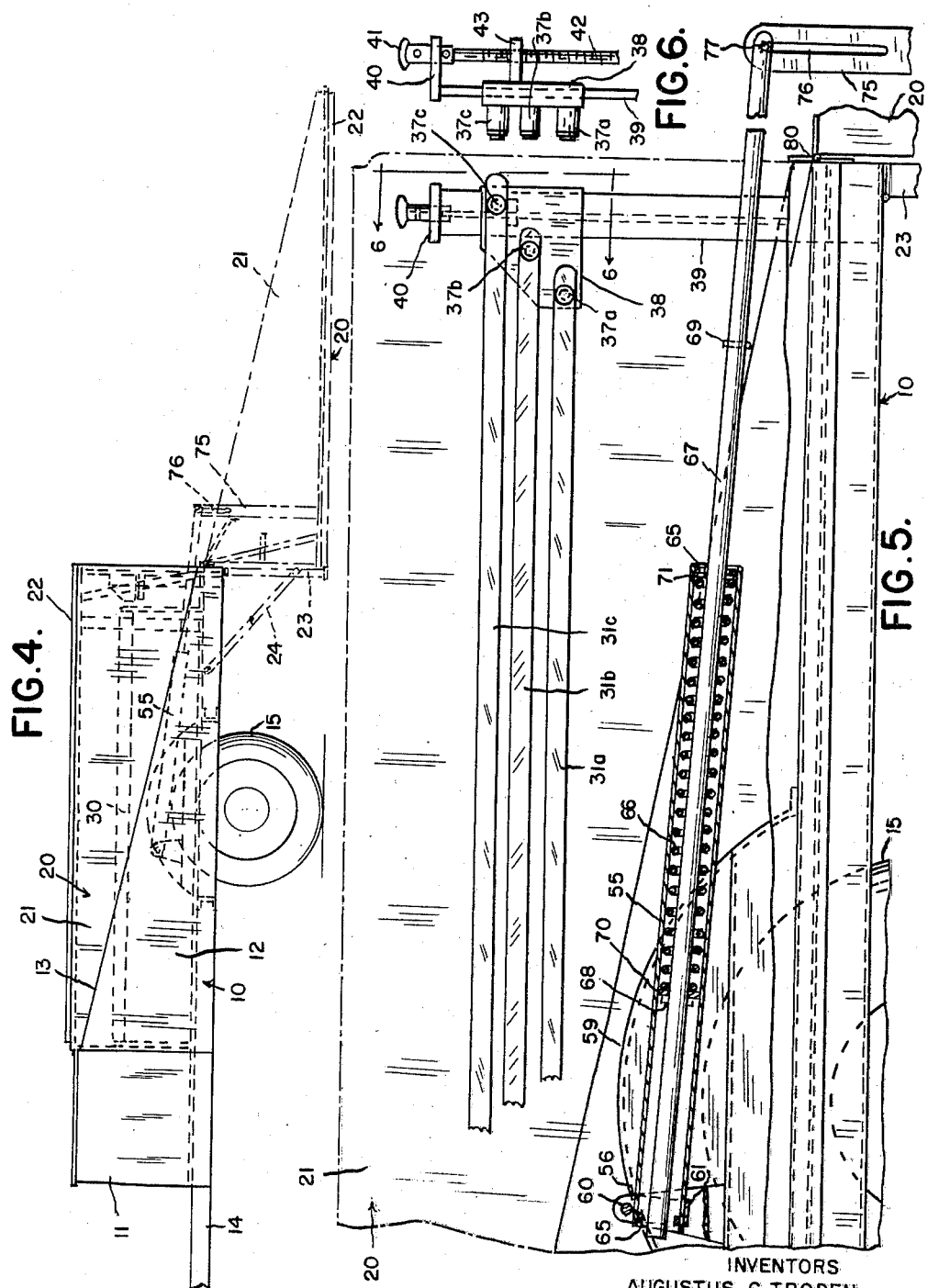

Patented Apr. 17, 1951

2,549,266

UNITED STATES PATENT OFFICE 2,549,266

CAMP TRAILER STRUCTURE

Augustus C. Troden, Grosse Pointe, and Nelson Hall, Detroit, Mich., assignors, by mesne assignments, of one-half to said Troden and one-half to William A. Paxton Application November 18, 1946, Serial No. 710,690

11 Claims. (Cl. 296—23)

The present invention relates to camp trailer structure and more particularly to a trailer having a body comprising hinged top and bottom parts, the top part of which is adapted to rest flat upon the ground when swung through 180° to fully open position.

It is an object of the present invention to provide in a trailer of the type referred to counterbalancing means effective to assist initial opening or closing movement of the top part.

It is a further object of the present invention to provide a counterbalancing mechanism for the hinged top of a trailer body having a shiftable connection with respect to a part so as to keep its line of action always at the same side of the hinged connection.

It is a further object of the present invention to provide a camp trailer having a fabric cover in conjunction with means for tensioning or loosening the cover as circumstances require.

Other objects and features of the invention will become apparent as the description proceeds, especially when taken in conjunction with the accompanying drawings, wherein:

Figure 4 is a side elevation of the trailer with the top part shown in full lines in closed position and in dotted lines in open position;

Figure 5 is an enlarged fragmentary side elevation view showing the counterbalancing mechanism and the cover adjusting mechanism;

Figure 6 is a fragmentary end elevation on the line 6—6 of Figure 5;

Figure 1:
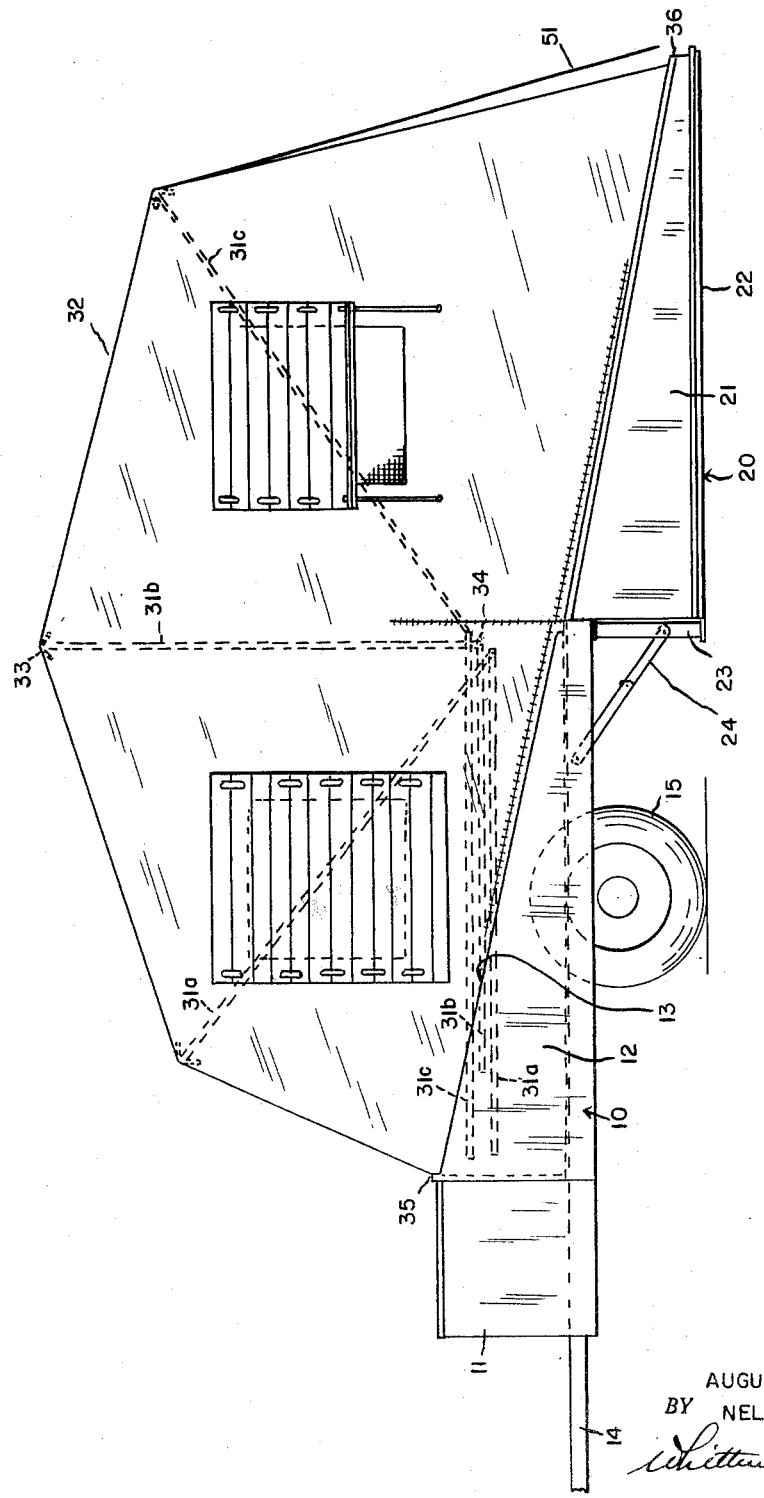
Figure 1 is a side elevation of the trailer with the top part open and the fabric cover in place.

The trailer comprises a bottom part 10 having a compartment 11 at its forward end, the side walls 12 of the bottom part being inclined as indicated at 13 so as to have their minimum height at the rear end of the trailer. A suitable hitch 14 is provided and the entire trailer body is supported on a pair of wheels 15. Hinged to the rear of the bottom part 10 is a top part 20 having side walls 21 also inclined so as to form in effect a substantial continuation of the inclined side walls 12 of the bottom part 10 when the top part 20 is in fully open position. The top wall 22 of the top part 20 is flat and the parts are so proportioned that the top 22 lies flat upon the ground when the top part 20 is in fully open position. Legs 23 which are hinged to the bottom part 10 are provided with foldable braces 24 for maintaining them in operative position.

Figure 2:
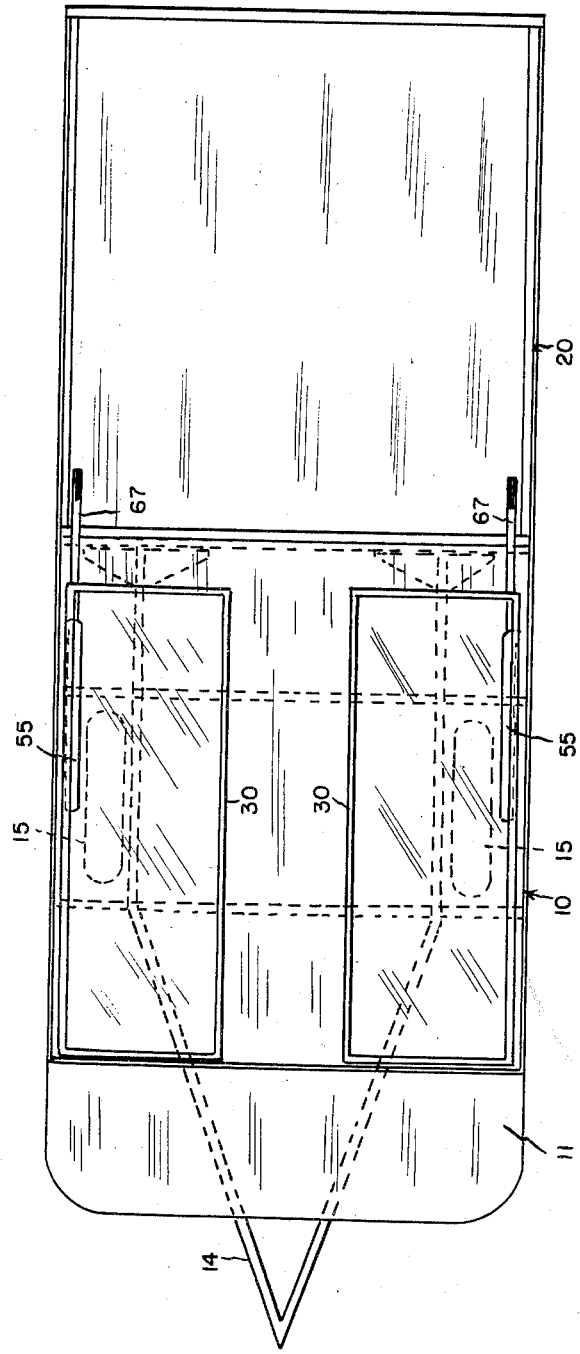
Figure 2 is a plan view of the trailer.
Figure 3:
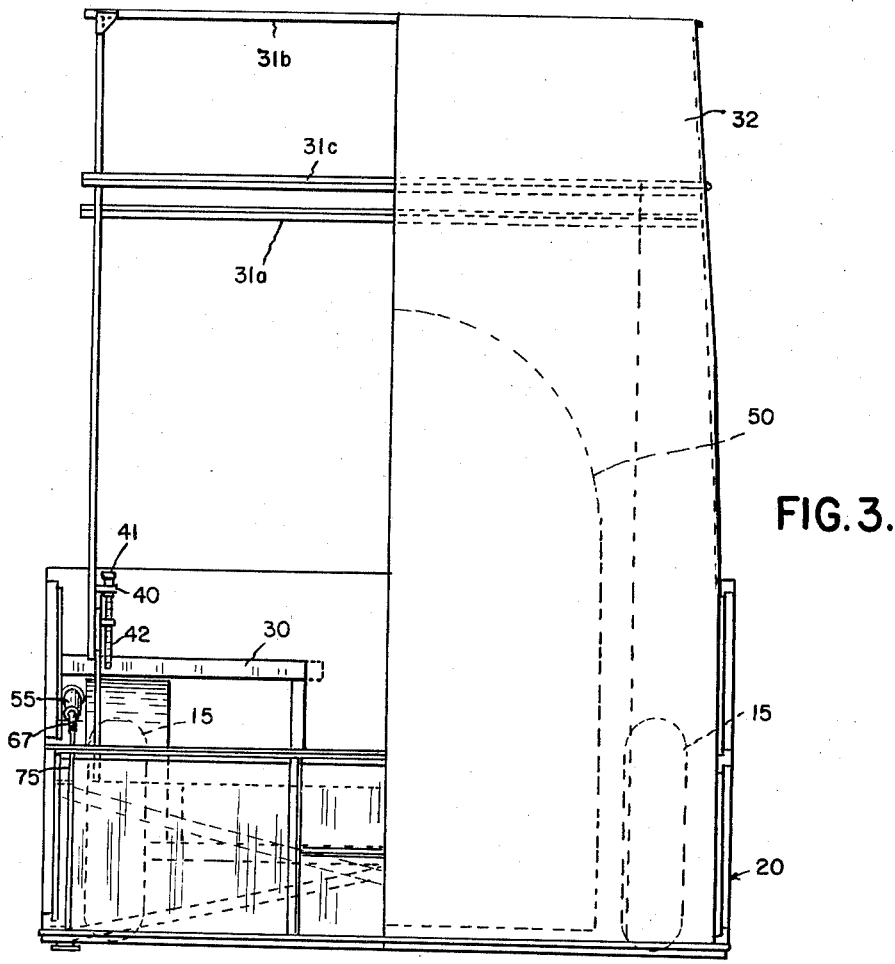
Figure 3 is a rear elevation of the trailer with a portion of the fabric cover removed.

As best seen in Figure 2, the bottom part 10 of the trailer is of a size to accommodate a pair of beds 30 to afford sleeping accommodations, and the top part 20 when in open position provides a floor for the open trailer. In order to provide a cover for the trailer, a plurality of generally U-shaped frames 31a, 31b and 31c are provided, the frames being secured to the fabric cover 32 at their upper ends as indicated at 33 and having a pivotal mounting 34 at their lower ends. The forward end of the fabric 32 is secured to the forward end of the bottom part 10 at 35 and the fabric is secured to the corresponding end of the top part 20 as indicated at 36. The fabric 32 and the frames 31a, 31b and 31c are designed to be housed within the body when the top part 20 is in closed position. It will be appreciated that as the top part 20 is swung through 180° to the position illustrated in Figure 1, the fabric cover is automatically extended to the position shown.

Means are provided for tensioning and slackening the fabric 32, and this means is best illustrated in Figure 5. The U-shaped frames 31a, 31b and 31c are mounted for pivotal movement about pins 37a, 37b and 37c, respectively, which pins are carried on a vertically adjustable plate 38. The plate 38 is vertically slidable on a mast 39 which terminates at its upper end in a laterally projecting arm 40 to which is journalled an adjusting finger piece 41 secured to a screw 42. The plate 38 is provided with a threaded arm 43 which receives the screw 42. It will be apparent that rotation of the screw 42 by the finger piece 41 results in up and down adjustment of the plate 38. Thus in the event that the fabric 32 becomes wet and shrinks, the plate 38 may be moved downwardly to reduce the tension thereon. Correspondingly, when the fabric dries and becomes slack, tension may be taken up by raising the plate 38 on the mast 39.

As best seen in Figure 1, the frame 31c is the longest and the frame 31b is the shortest, so that when assembled the cover 32 is positioned to provide substantial head room as shown.

Entrance to the interior of the covered trailer body is provided through a door opening 50 in the fabric 32 which may be normally closed by a flap 51.

Figure 7:
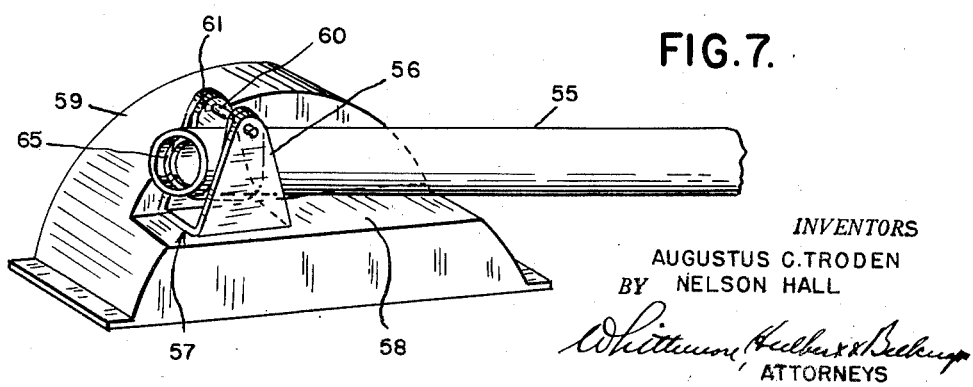
Figure 7 is a fragmentary perspective view of a support for the counterbalancing mechanism.

The top part 20 of the trailer is relatively heavy, and in order to assist its initial movement from fully open or fully closed position, counterbalancing mechanism is employed. This counterbalancing mechanism is best illustrated in Figure 5, and comprises a tube or sleeve 55 mounted between upstanding arms 56 of a U-shaped support 57 (Figure 7) which is mounted in a formed recess 58 provided in the upwardly convex wheel housings 59. The sleeve 55 is mounted for swinging movement about pivot pins 60 and is supported therefrom by a U-shaped strap 61.

Referring again to Figure 5, the sleeve 55 is provided at its ends with annular abutments 65 and a compression spring 66 is housed within the sleeve. Extending through the sleeve 55 in telescopic relation therewith is a rod 67 having spaced abutment pins 68 and 69 thereon. The pins 68 and 69 are of a size to pass through the opening of the annular abutments 65. The rod 67 passes through the spring 66 and pins 68 and 69 are adapted to engage slidable rings 70 and 71, respectively. The rings 70 and 71 serve as spring seats.

Referring now to Figure 4, the top part 20 of the trailer body is provided with a post 75 having a slot 76 extending longitudinally thereof near its upper end. The rearmost end of the rod 67, as best seen in Figure 5, is connected to the slot 76 in the post 75 by a pin 77 which is slidable in the slot. In Figure 5 the top part 20 of the trailer body is indicated in full lines in fully open position, and it will be observed that the rod 67 has been moved to the right so that the pin 68 engages the spring abutment 70 and has compressed the spring 66 against the spring abutment 71 which rests against the annular abutment 65. The spring at this time is therefore exerting a force on the rod 67, which is to the left as seen in this figure, and this force as transmitted to the post 75 tends to raise the top part 20 of the trailer and to swing the same in counterclockwise direction toward closed position. It will be appreciated of course that the strength of the spring is selected such that it counterbalances a predetermined portion of the weight of the top part so that it may be swung with as little effort as desired.

As the top part 20 is swung in counterclockwise direction as seen in Figure 5 toward the closed position indicated in broken lines, the post 75 swings with it about the axis of the hinge 80 between the top part 20 and the bottom part 10 of the trailer body. This results in a bodily movement of the rod 67 toward the left, this movement being accompanied with a slight upward swinging movement about the axis of the pin 60. When the top part 20 of the trailer body is in substantially vertical position, or in other words is half way closed, the parts are designed so that the spring 66 has expanded so that spring stop 70 is moved into engagement with the annular abutment 65 at the left-hand end of the sleeve 55. It will be observed that at this time the elongated slot 76 is in substantial alignment with the rod 67. Further movement of the top part 20 in counterclockwise direction as viewed in Figure 5 will result first in shifting of the pin 77 from the end of the slot shown to the bottom of the slot. After the pin 77 reaches the bottom of the slot 76 further closing movement of the top part 20 will result in continued bodily movement of the rod 67 to the left as viewed in this figure, with the result that the pin 69 engages the spring seat 71 and compresses the spring 66 toward the left-hand end of the sleeve. Accordingly, when the top part 20 of the trailer body is in fully closed position the compression spring 66 is acting to urge the rod 67 to the left. Due to the fact that the connection between the rod 67 and the slot 76 is shifted to the opposite end of the slot, this force tends to swing the top part 20 of the trailer body in a clockwise direction and assists its initial opening movement. It will be appreciated that without the shiftable connection between the rod 67 and the post 75, the line of action of the spring 66 would pass over center so that the effect of the construction just described is to maintain the line of action of the spring always on the same side of the hinged connection between the top and bottom parts of the trailer body while the direction of action of the spring is reversed substantially midway between opening and closing or closing and opening movement of the top part 20.

While there has been illustrated and described a specific embodiment of the improved camp trailer structure, it will be appreciated that this full and complete illustration and description has been made solely to enable those skilled in the art to practice the invention, the scope of which is indicated by the appended claims.

What we claim as our invention is:

1. A trailer body comprising hinged top and bottom parts, said top part being movable through substantially 180° between fully open and closed position, spring counterbalancing means effective to assist both opening and closing movement of said top and comprising a spring, relatively slidable spring stressing elements pivotally connected between said parts, the connection between one of said parts and one of said elements being shiftable in a direction transverse to the axis of the hinged connection between said parts, said connection comprising a slotted post rigidly connected to said top, and a pin carried by said one element slidable in said slot, said spring stressing elements being effective to reverse the direction of action of said spring as said top moves through an intermediate position, the slot in said post being substantially parallel to the line of action of said spring when its direction of action is reversed.

2. A trailer body comprising hinged top and bottom parts, said top part being movable through substantially 180° between fully open and closed position, spring counterbalancing means effective to assist both opening and closing movement of said top and comprising a sleeve element pivoted to one of said parts, a rod element pivoted to the other of said parts and slidable in said sleeve upon movement of said top part, a compression spring in said sleeve surrounding said rod, spaced spring abutments in said sleeve at both ends thereof, and spaced spring abutments on said rod dimensioned to pass through the spring abutments in said sleeve, said elements being connected to the top and bottom parts of the trailer body such that swinging movement of the top in one direction between fully open and fully closed position results in relative sliding movement between said elements in one direction.

3. A trailer body comprising hinged top and bottom parts, said top part being movable through substantially 180° between fully open and closed position, spring counterbalancing means effective to assist both opening and closing movement of said top and comprising a sleeve element pivoted to one of said parts, a rod element pivoted to the other of said parts and slidable in said sleeve upon movement of said top part, a compression spring in said sleeve surrounding said rod, spaced spring abutments in said sleeve at both ends thereof, and spaced spring abutments on said rod dimensioned to pass through the spring abutments in said sleeve, said elements being connected to the top and bottom parts of the trailer body such that swinging movement of the top in one direction between fully open and fully closed position results in relative sliding movement between said elements in one direction, one of said elements having a shiftable connection to its part effective to keep the line of action of said spring at the same side of said hinged connection as said top moves through 180°.

4. A trailer body comprising a bottom section, sides, and a top section, one of said sides extending upwardly from and forming a part of said bottom section, the opposite side thereof extending downwardly from and forming a part of said top section, a hinged connection between said bottom and top sections located substantially adjacent the bottom edge of said opposite side, a post extending from the inner side of said top for a distance substantially equal to the height of the sides of body, said post having a longitudinally extending slot terminating adjacent the free end thereof, a counterbalancing device comprising a telescopically arranged sleeve and rod, one end of said device pivotally and slidably secured to the slot in said post, the other end of said device pivotally secured to said bottom section, and spring means in said tube stressed in opposite directions by movement of said top section to either fully open or fully closed position.

5. An enclosure having a first portion, a second portion, a hinge connecting said portions at one side thereof for open and closing relative movement through substantially 180 degrees of arc, spring biasing means effective to assist opening and closing movement of said portions, said means comprising a member rigidly connected to said first portion and having an elongated slot disposed to extend perpendicular to the axis of said hinge and to extend substantially equally at opposite sides of said hinge and to be substantially parallel to the direction of relative motion between said portions adjacent open and closed positions, and to be substantially perpendicular to the direction of relative motion between said portions in intermediate position, resilient means connected to the said second portion including a pin slidable in the said slot, means for reversing the direction of action of said resilient means as said portions pass through said intermediate position to cause said pins to move from one end of the slot to the other and to maintain the line of action of said resilient means always at the same side of said hinge.

6. An enclosure comprising a main portion and a cover portion, a hinge connecting said portions for substantially 180 degrees of swinging movement, elongated spring biasing means pivotally secured to one portion at the side opposite said hinge and slidably secured to the other portion adjacent said hinge, a member carried by said other portion having an elongated slot in which the end of said biasing means is slidable, said slot being disposed substantially perpendicular to the length of said elongated biasing means, when said cover portion is fully open or closed, and extending to opposite sides of said hinge, and means for reversing the direction of action of said biasing means as said cover portion moves past an intermediate open position.

7. Structure as defined in claim 5 in which said spring biasing means comprises a tube having spring abutments at its opposite ends, a compression spring in said tube, a rod slidable in said tube, and spaced spring abutments on said rod slidable through the spring abutments in said tube.

8. In a spring biasing means for the hinged cover of an enclosure, a tubular member having a compression spring therein, spring abutments in said tube at both ends thereof, a rod slidable through said tube, and spaced spring abutments on said rod slidable through the spring abutments in the ends of said tube, the spring abutments on said rod acting to compress the spring against the spring abutment at the opposite end of said tube.

9. The structure as defined in claim 8 in which said spring biasing means is attached at opposite ends between the enclosure and its hinged cover, and means are provided for maintaining the line of action always at the same side of the hinge.

10. An enclosure, a cover for said enclosure, a horizontal hinge connecting said cover to said enclosure at one side thereof, biasing means operable to assist initial opening and closing movement of said cover comprising a pair of relatively longitudinally slidable elongated members, resilient means opposing relative sliding movement between said members in either direction from an intermediate position, one of said members being pivoted to said enclosure at the side thereof opposite said hinge, the other of said members having a pin slidable in a slot provided in said cover adjacent said hinge, said slot being substantially vertical and extending above and below the hinge axes when the cover is open or closed, and passing through an intermediate position above said hinge in which it is in substantial alignment with said members when said cover is half open, the action of said resilient means in opposing relative sliding between said members from an intermediate position in either direction causing sliding of said pin to the end of said slot which will be above the hinge axes in final position of the cover as said cover is swung to either open or closed position, whereby the line of action of said biasing means remains above the hinge axis at all times.

11. An open topped enclosure, a cover for said enclosure, a hinge connecting said cover to said enclosure for swinging movement of substantially 180 degrees between closed and full open position, elongated guide means on said cover occupying a plane substantially perpendicular to the axis of said hinge, counterbalance mechanism extending between a fixed point on said enclosure and said guide means and including means slidable on said guide means from end to end thereof, said guide means being substantially perpendicular to the line of action of said counterbalance mechanism when said cover is open or closed and passing through a position substantially parallel to the line of action of said counterbalance mechanism when said cover is half open, means for reversing the direction of action of said counterbalance mechanism as said cover moves from open to closed position or from closed to open position, to cause the means on said counterbalance mechanism slidable on said guide means to slide from one end thereof to the other as said cover passes through half open position, the ends of said guide means being located with respect to the hinge axis and the said fixed point such that the line of action of said counterbalance mechanism remains always at the same side of an imaginary line drawn from said fixed point to the axis of said hinge to reverse the torque exerted on said cover as a result of the reversal of direction of action of said counterbalance mechanism upon movement of said cover between closed and full open position.

AUGUSTUS C. TRODEN.
NELSON HALL.

REFERENCES CITED

The following references are of record in the file of this patent:

UNITED STATES PATENTS

| Number | Name | Date |
|---|---|---|
| 609,553 | Lloyd | Aug. 23, 1898 |
| 899,430 | Pack | Sept. 22, 1908 |
| 1,107,665 | Gasau et al. | Aug. 18, 1914 |
| 1,109,734 | Bauer | Sept. 8, 1914 |
| 1,185,981 | Campbell | June 6, 1916 |
| 1,707,960 | Gilkinson | Apr. 2, 1929 |
| 1,798,463 | Frank | Mar. 31, 1931 |
| 1,881,482 | Gilkinson | Oct. 11, 1932 |
| 1,895,933 | Kuns | Jan. 31, 1933 |
| 2,044,351 | Eriksson | June 16, 1936 |

FOREIGN PATENTS

| Number | Country | Date |
|---|---|---|
| 103,814 | Australia | Apr. 26, 1938 |
| 498,162 | Great Britain | Jan. 4, 1939 |
| 807,639 | France | Oct. 19, 1936 |